United States Patent
Komada

(10) Patent No.: US 7,813,550 B2
(45) Date of Patent: Oct. 12, 2010

(54) IMAGE PROCESSING METHOD, IMAGE PROCESSING PROGRAM, AND STORAGE MEDIUM WITH A PRESCRIBED DATA FORMAT TO DELETE INFORMATION NOT DESIRED

(75) Inventor: Yasuo Komada, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 11/466,937

(22) Filed: Aug. 24, 2006

(65) Prior Publication Data

US 2007/0046985 A1    Mar. 1, 2007

(30) Foreign Application Priority Data

Sep. 1, 2005  (JP) .............................. 2005-253794

(51) Int. Cl.
G06K 9/34 (2006.01)
(52) U.S. Cl. .................... 382/177; 382/103; 358/1.15
(58) Field of Classification Search ................ 358/1.15; 382/103, 177
See application file for complete search history.

(56) References Cited

U.S. PATENT DOCUMENTS

| | | | | |
|---|---|---|---|---|
| 5,115,326 A | * | 5/1992 | Burgess et al. | 358/440 |
| 5,593,390 A | * | 1/1997 | Castellano et al. | 604/187 |
| 5,610,995 A | * | 3/1997 | Zheng et al. | 382/183 |
| 6,466,329 B1 | | 10/2002 | Mukai | |
| 2001/0029513 A1 | | 10/2001 | Kuwano et al. | 707/522 |
| 2002/0116401 A1 | * | 8/2002 | Kashito et al. | 707/200 |
| 2003/0097301 A1 | * | 5/2003 | Kageyama et al. | 705/14 |
| 2004/0032400 A1 | * | 2/2004 | Freeman et al. | 345/173 |
| 2004/0126098 A1 | * | 7/2004 | Kim et al. | 386/117 |

FOREIGN PATENT DOCUMENTS

| | | |
|---|---|---|
| JP | 9-191391 | 7/1997 |
| JP | 10-285378 | 10/1998 |
| JP | 10-308868 | 11/1998 |

OTHER PUBLICATIONS

Office Action dated Apr. 2, 2010 in JP 2005-253794.

* cited by examiner

*Primary Examiner*—Vikkram Bali
*Assistant Examiner*—Eueng-Nan Yeh
(74) *Attorney, Agent, or Firm*—Fitzpatrick, Cella, Harper & Scinto

(57) ABSTRACT

The object of this invention is to reduce the effort of deleting and information symbol from a read image. To accomplish this, an image of a document with an information symbol is read (S100), and the information symbol is identified in the read image (S130). The identified information symbol is decoded (S150), and it is determined on the basis of the decoding result whether the data format of the information symbol is a desired one (S160). On the basis of the determination, if the data format is the desired one, the information symbol is deleted from the read image (S170).

5 Claims, 19 Drawing Sheets

FIG. 5
(a) TWO-DIMENSIONAL CODE (QR CODE) 4001 AND
RESULT OF DECODING QR CODE
(b) TWO-DIMENSIONAL CODE (QR CODE) 4002 AND
RESULT OF DECODING QR CODE F I G. 15
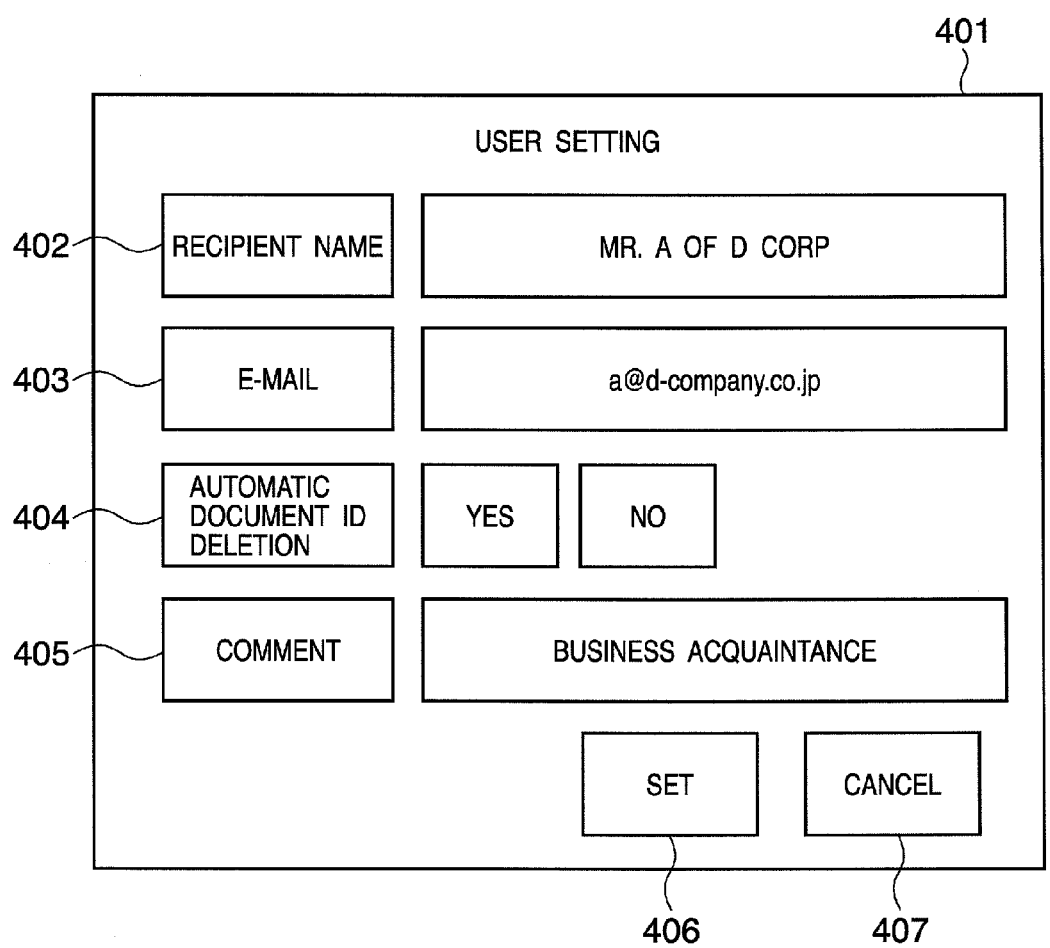

IMAGE PROCESSING METHOD, IMAGE PROCESSING PROGRAM, AND STORAGE MEDIUM WITH A PRESCRIBED DATA FORMAT TO DELETE INFORMATION NOT DESIRED

BACKGROUND OF THE INVENTION

1. Field of the Invention

The present invention relates to an image processing apparatus, image processing method, image processing program, and storage medium.

2. Description of the Related Art

There have conventionally been known techniques of printing an information symbol and allowing access from the printed information symbol to an original electronic document (see Japanese Patent Laid-Open No. 10-308868).

As an example of the techniques, there is known a method of printing a composite of an original electronic document stored in a server or the like and an information symbol containing the location information of the electronic document and the like in the form of a barcode or a two-dimensional code when the electronic document is to be printed and re-accessed using the printed information symbol.

FIG. 4A shows an example of document containing QR codes as two-dimensional codes. Reference numeral 4000 denotes a document containing QR codes, and reference numerals 4001 and 4002 denote QR code. QR code 4002 is an information symbol used to supplement the explanation given in the document. Link information to a map information site is encoded within the code. This saves the trouble of manually inputting the site address and only needs to take a photo of the code with a CCD camera mounted on a cellular phone or the like and analyzing the information. This operation makes it possible to view map information with a Web browsing software or the like.

QR code 4001 is used as a document ID which includes the location of the original electronic document. It is possible to easily access the original electronic document by analyzing and decoding the QR code printed on paper.

(a) in FIG. 5 shows an example of a result of decoding the QR code 4001, and (b) in FIG. 5 shows an example of a result of decoding QR code 4002. In these examples, QR code 4001 contains a formatting system and its version information, the name of the original file, the creator of the original file, the location of the original file, comments, and the like. QR code 4002 contains homepage information, and the Web browsing function of a cellular phone or the like automatically displays a corresponding homepage using a character string "URL to:" contained in the decoding result.

However, if such a paper document is copied, transmitted over a network, or faxed, an information symbol printed in the document is also distributed. If a user does not want others to know the location of the original electronic data of a paper document, the user needs to perform an operation such as deleting the information symbol on the document using correction fluid. This is troublesome and inconvenient.

SUMMARY OF THE INVENTION

The present invention has been made to solve the conventional problem, and has as its object to provide a technique which can reduce the effort of deleting an information symbol.

According to the present invention, the foregoing object is attained by providing an image processing apparatus having:

an image reading unit which reads an image of a document with an information symbol;

an identification unit which identifies the information symbol in the read image;

a decoding unit which decodes the information symbol identified by the identification unit;

a determination unit which determines on the basis of a decoding result from the decoding unit whether a data format of the information symbol is a prescribed data format; and a deletion unit which deletes the information symbol from the read image if the data format is the prescribed data format on the basis of a determination made by the determination unit.

According to another aspect of the present invention, the foregoing object is attained by providing an image processing method including:

an image reading step of reading an image of a document with an information symbol;

an identification step of identifying the information symbol in the read image;

a decoding step of decoding the information symbol identified in the identification step;

a determination step of determining on the basis of a result of the decoding in the decoding step whether a data format of the information symbol is a prescribed data format; and a deletion step of deleting the information symbol from the read image if the data format is the prescribed data format on the basis of the determination made in the determination step.

In still another aspect of the present invention, the foregoing object is attained by providing a storage medium computer-readably storing an image processing program for causing a computer to execute:

an image reading step of reading an image of a document with an information symbol;

an identification step of identifying the information symbol in the read image;

a decoding step of decoding the information symbol identified in the identification step;

a determination step of determining on the basis of a result of the decoding in the decoding step whether a data format of the information symbol is a prescribed data format; and a deletion step of deleting the information symbol from the read image if the data format is the prescribed data format on the basis of the determination made in the determination step.

Further features of the present invention will become apparent from the following description of exemplary embodiments (with reference to the attached drawings).

BRIEF DESCRIPTION OF THE DRAWINGS

FIG. 5 is a view showing examples of results of decoding two-dimensional codes (QR codes) on the document sample in FIG. 4A in the image processing apparatus of this embodiment;

FIG. 15 is a conceptual view of an operation unit when setting an address book in the image processing apparatus of the ninth embodiment;

DESCRIPTION OF THE EMBODIMENTS

First Embodiment

<Overview>

There is known a method of printing a composite of an original electronic document stored in a server or the like and a document ID including information on where the electronic document is stored in the form of a barcode or two-dimensional code when the electronic document is to be printed and reaccessing the electronic document from the printed ID. This method makes it possible to easily access an original electronic document from a printed paper document even without knowing where the electronic document is stored. However, if a paper document is copied, transmitted over a network, or faxed, a document ID printed in the document is also distributed. If a user does not want others to know the document ID, the user needs to perform operation such as deleting the document ID on the document using correction fluid.

In this embodiment, means for automatically recognizing and deleting a document ID when copying or transmitting a paper document is provided to ameliorate the above-described disadvantage. This makes it possible to automatically delete a document ID even in an environment where access to an original electronic file is unavailable (e.g., on the road) and eliminates the need to manually delete the document ID of a paper document. Even if an addition is made to the document, the document ID can be deleted with the added information left.

<Specific Configuration>

Figure 1:
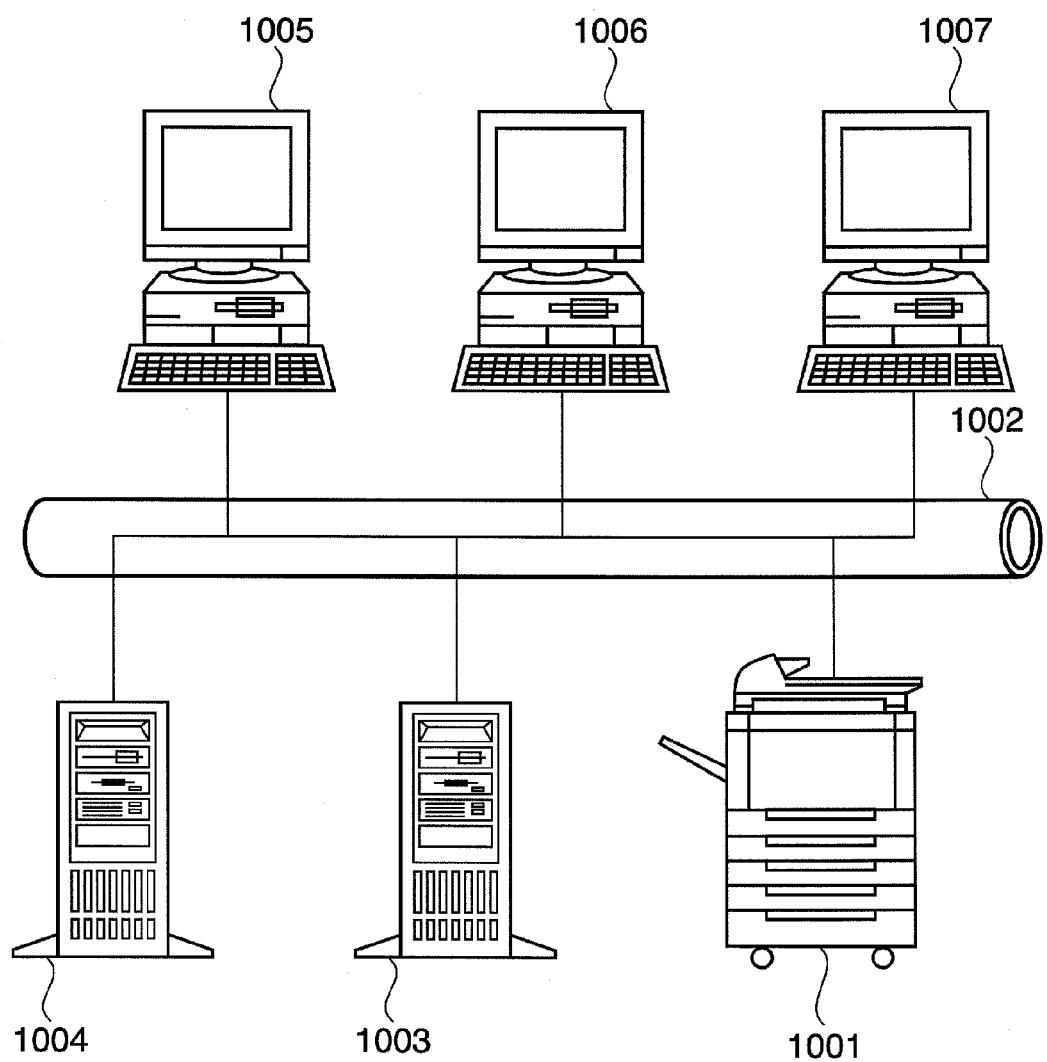
FIG. 1 is a view showing a basic network system configuration according to the first embodiment of the present invention.

FIG. 1 is a view showing a system configuration to which an image processing apparatus according to a first embodiment of the present invention can be applied.

Reference numeral 1001 denotes an image processing apparatus 1001 having a scanner unit and printer unit which can read and copy a document of a plurality of pages or transmit an image to an external apparatus. Reference numeral 1003 denotes a file server/mail server (to be simply referred to as a server hereinafter) which stores data read by the image processing apparatus 1001. The server 1003 has functions as an FTP server, NetWare server, SMB server, SMTP server, and the like. Reference numeral 1004 denotes a facsimile server which stores data to be transmitted and received by fax. Reference numerals 1005, 1006, and 1007 denote client computers (to be simply referred to as clients hereinafter). The clients 1005, 1006, and 1007 connect to the server 1003 or 1004 and display data. Reference numeral 1002 denotes an Ethernet (registered trademark) network. The Ethernet network 1002 is a network to which the image processing apparatus 1001, servers 1003 and 1004, and clients 1005, 1006, and 1007 are connected.

Figure 2:
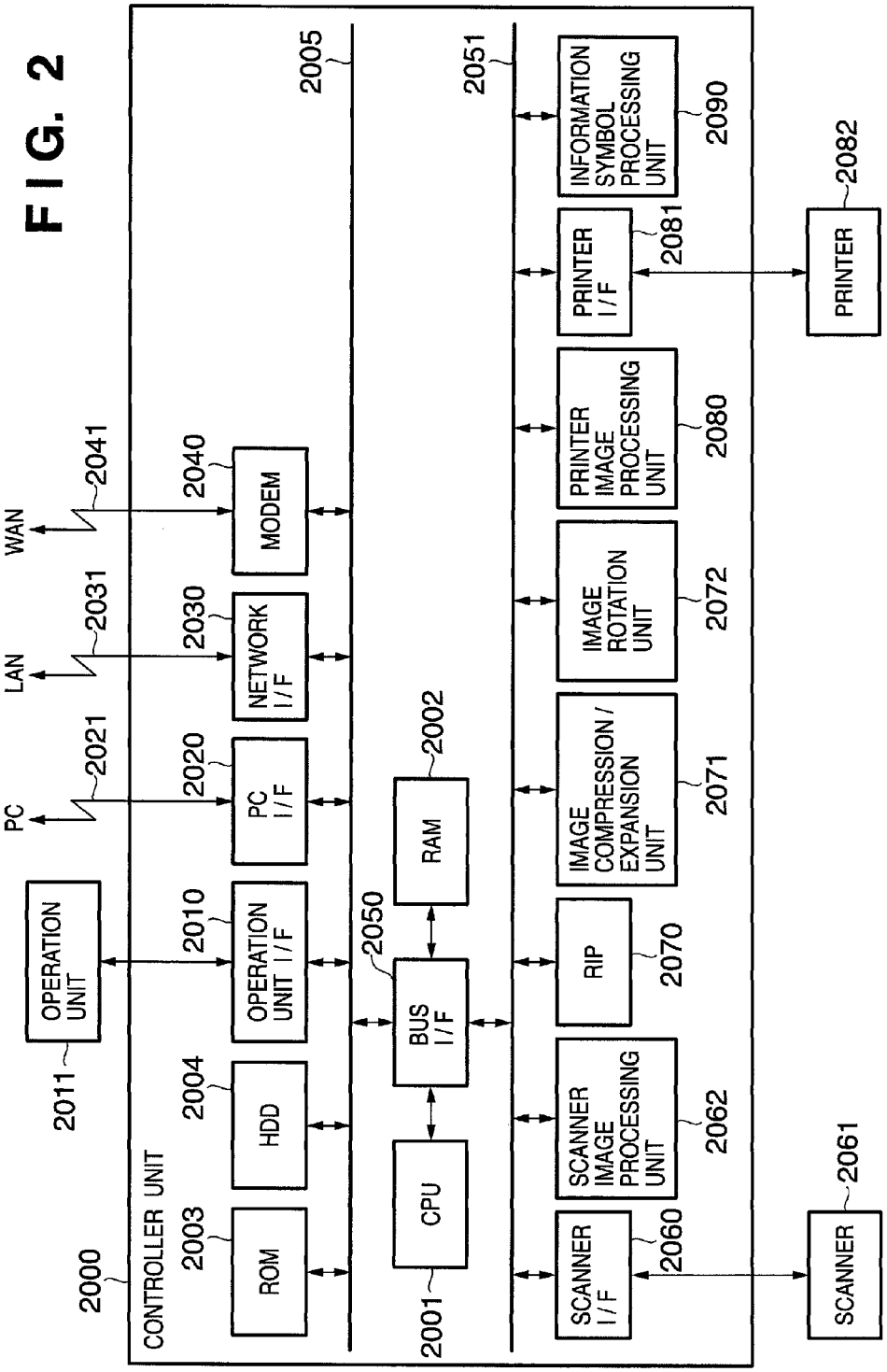
FIG. 2 is a block diagram showing the system configuration of an image processing apparatus of this embodiment.

FIG. 2 shows a block diagram of the system configuration of the image processing apparatus 1001. The image processing apparatus 1001 is mainly composed of a controller unit 2000, an operation unit 2011, a scanner 2061 as image reading means, and a printer 2082 as recording means.

The image processing apparatus 1001 can connect with a PC 2021, a LAN 2031, or a public network (WAN) 2041 to input and output image information. Components of the controller unit 2000 will be explained. Reference numeral 2001 denotes a CPU which controls the entire image processing apparatus. Reference numeral 2050 denotes a bus I/F 2050. The bus I/F 2050 is a bus bridge connecting the CPU 2001, a RAM 2002, a system bus 2005, and an image bus 2051 which allows high-speed transfer of image data and converts the structure of data to be exchanged between them into another corresponding to a destination.

The RAM 2002 is a system work memory used by the CPU 2001 to operate. The RAM 2002 also functions as an image memory for temporarily storing image data such as storing an image read by the image reading unit, storing an image to be printed out by the image recording unit, or storing an image as data to be transmitted and received by fax.

Devices arranged on the system bus 2005 will be explained.

A ROM 2003 is a boot ROM which stores a program code including instructions for a boot operation of the CPU 2001, initial value data, table data, and the like.

An HDD 2004 is a hard disk drive and stores an operating system (OS) program code, table data, and image data. An operation unit interface 2010 is a section which interfaces with the operation unit 2011 having a touch panel. The operation unit interface 2010 outputs data to be displayed on the panel to the operation unit 2011 and transfers information input from the operation unit 2011 by a user to the CPU 2001.

A PC interface 2020, a network interface 2030, and a MODEM 2040 are connected to the PC 2021, LAN 2031, and public network 2041, respectively, and input and output information.

Devices arranged on the image bus 2051 will be explained.

A scanner I/F 2060 is an interface with the scanner 2061 as an image input device which performs synchronous/asynchronous conversion. A scanner image processing unit 2062 performs, for input image data, image processes such as correction, processing, and editing.

A raster image processor (RIP) 2070 converts PDL codes into a bitmap image. An image compression/expansion unit 2071 performs compression/expansion processing for multilevel image data using JPEG and performs compression/expansion processing for binary image data using JBIG, MMR, or MH. An image rotation unit 2072 performs rotation processing for image data. A printer image processing unit 2080 performs, for image data to be printed out, image processes such as printer correction and resolution conversion. A printer I/F 2081 is an interface with the printer 2082 as an image output device which performs synchronous/asynchronous conversion. An information symbol processing unit 2090 performs pattern matching and expansion processing for a barcode, two-dimensional code, or the like.

Figure 3:
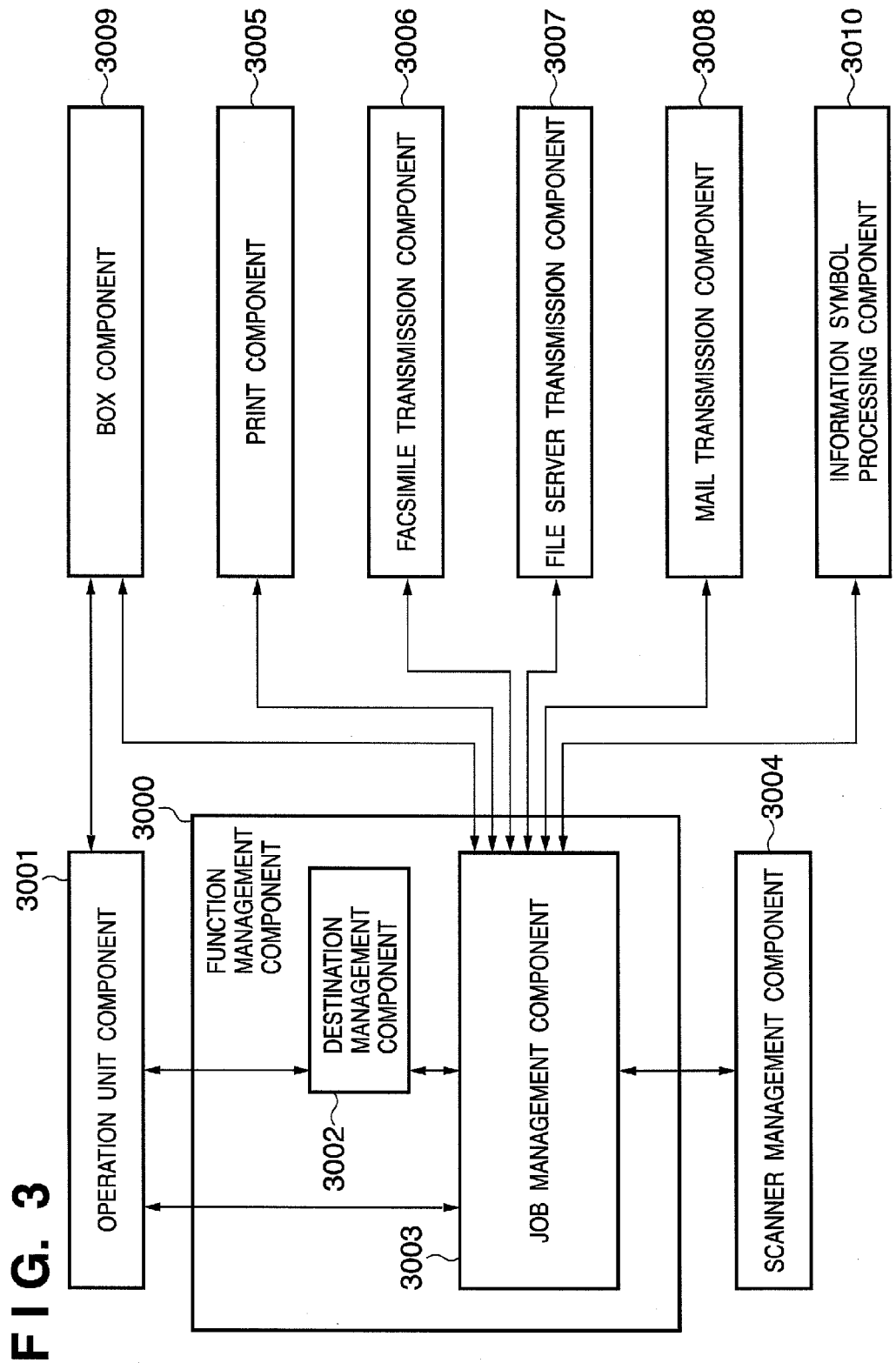
FIG. 3 is a block diagram showing the software configuration of a transmission function in the image processing apparatus of this embodiment.

FIG. 3 is a block diagram showing a software configuration of this embodiment. The software configuration is performed by the CPU 2001 in the controller unit 2000.

An operation unit component 3001 acquires various pieces of information by operating a touch key of the operation unit 2011 by a user. In the case of copying, pieces of information to be acquired for a target image include, e.g., a resolution, a type (black-and-white or color), and the number of copies. In the case of transmission, the operation unit component 3001 acquires, for an image to be transmitted, pieces of information such as a resolution, a type (black-and-white or color), a transmission protocol, an image format at the time of transmission, and a transmission destination. In the case of transmission, additional text information, whether to overlay the additional text information on the image, whether to add a thumbnail image, whether to add the number of pages, where the read image is stored, which images are selected among stored images, whether to encrypt the image, and the like may further be acquired.

A function management component 3000 instructs a scanner management component 3004 to read a document in accordance with a processing instruction selected in the operation unit component 3001. In the case of transmission, the function management component 3000 acquires destination information with a destination management component 3002. The function management component 3000 issues an instruction to process read image data to a print component 3005, a facsimile transmission component 3006, a file server transmission component 3007, or a mail transmission component 3008. This makes it possible to transmit an image file to the printer 2082 or facsimile server 1004 or hold an image in a box component 3009.

The file server transmission component 3007 can convert a plurality of images read into one image file and transmit the image file to the file server 1004 using three protocols, FTP, NetWare, and SMB.

The mail transmission component 3008 can convert a plurality of images read into one image file and transmit the image file to the mail server 1003 using the SMTP protocol.

The function management component 3000 is composed of the destination management component 3002 and a job management component 3003 which performs job control among the scanner management component 3004 and transmission components.

The box component 3009 can transmit an image file to an information storage area (to be referred to as a box hereinafter) for each user set in advance in the hard disk 2004 of the image processing apparatus 1001.

An information symbol processing component 3010 can analyze or decode barcode or two-dimensional code information processed by the information symbol processing unit 2090 and perform necessary processing.

Identification, decoding, determination, and deletion of an information symbol are performed by the information symbol processing unit 2090 and information symbol processing component 3010. That is, these components function as identification means, decoding means, determination means, and deletion means. A method of identifying an information symbol differs depending on the type of a target information symbol.

A method of identifying an information symbol will be explained. For example, assume a case where an information symbol is a barcode. A barcode is composed of wide bars, narrow bars, a space between each two adjacent ones of the bars, and margins for contrasting the symbol itself with the background. Accordingly, to which code the barcode corresponds is determined by identifying their presence and calculating the ratio between bars and spaces.

Assume a case where an information symbol is a two-dimensional code (e.g., a QR code). Since a two-dimensional code contains information not only in the first dimension (like a barcode) but also in the second dimension, it can be detected in the same manner.

Figure 6:
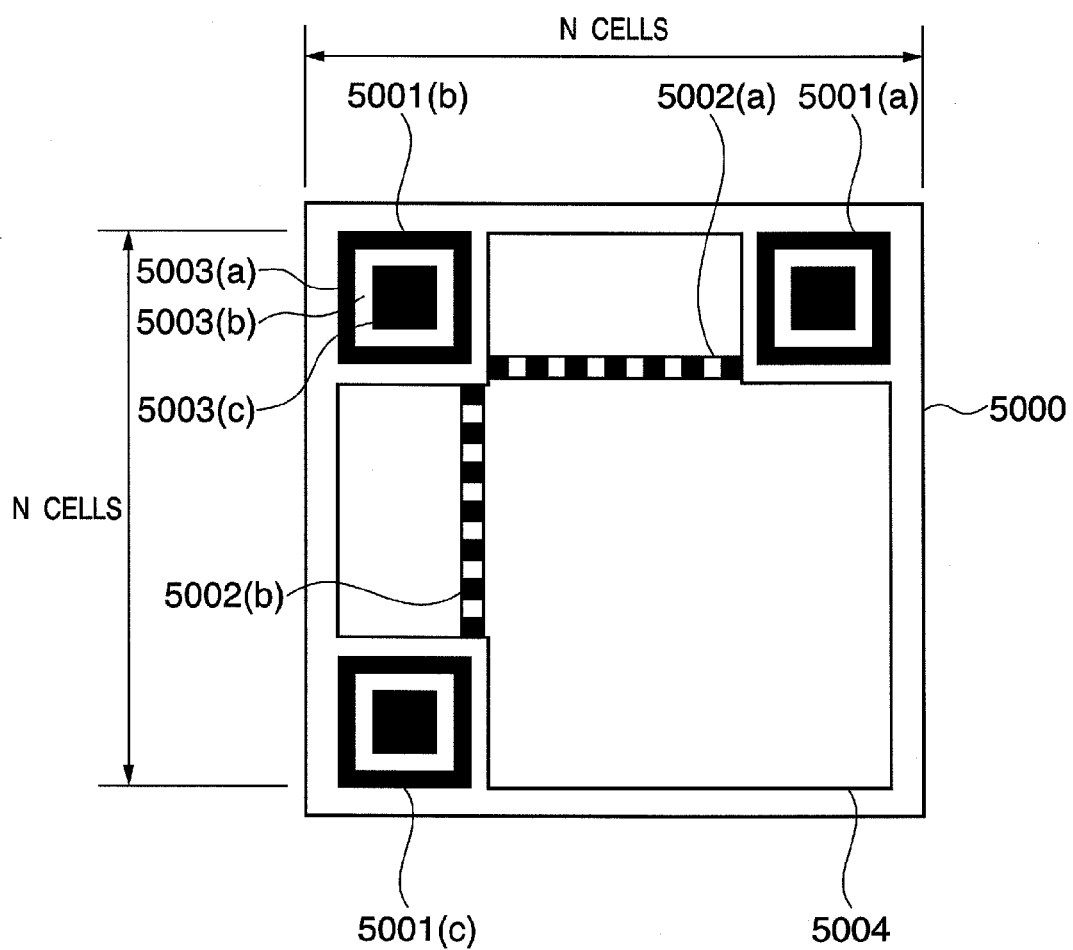
FIG. 6 is a view showing an example for explaining a two-dimensional code (QR code)

FIG. 6 shows an enlarged view of a two-dimensional code (QR code). A two-dimensional (QR) code 5000 is divided into n×n squares (to be referred to as cells hereinafter). The two-dimensional (QR) code 5000 is composed of three alignment symbols 5001(a), 5001(b), and 5001(c), timing cells 5002(a) and 5002(b) serving as reference patterns, and data cells 5004. The data cells 5004 are all shown in white for the sake of clarity.

Note that each of the alignment symbols 5001(a), 5001(b), and 5001(c) is formed by combining squares with a specific dimensional ratio. Identification of these alignment symbols makes it possible to easily detect the presence and direction of the two-dimensional (QR) code 5000 even if the two-dimensional code 5000 is inclined or reversed.

For example, assume that the alignment symbol 5001(b) is a figure formed by overlaying a black square 5003(a), a white square 5003(b), and a black square 5003(c) on one another so as to have a common center. The length of a side of the black square 5003(a) corresponds to seven cells. The length of a side of the white square 5003(b) corresponds to five cells. The length of a side of the black square 5003(c) corresponds to three cells.

If the ratio between black and white pixels on a line crossing the vicinity of the center of the alignment symbol 5001(b) is evaluated, a pattern of black, white, black, white, and black with a ratio of 1:1:3:1:1 is detected. For this reason, if a black-and-white pattern with the same ratio is detected, the pattern is considered as a candidate for the alignment symbol 5001(a), 5001(b), or 5001(c).

Each of the sets 5002(a) and 5002(b) of timing cells is composed of alternate white and black cells and serves as a reference pattern which is an index of the position of each data cell.

The data cells 5004 cover an area other than the reference patterns, i.e., timing cells. Each data cell is classified as white or black and is made to correspond to one-bit data.

Since the three alignment symbols 5001(*a*), 5001(*b*), and 5001(*c*) are located at three of four corners of a square, their positions can be calculated by pattern calculation. The timing cells 5002(*a*) or 5002(*b*) lie between adjacent ones of the alignment symbols, and the position of each data cell 5004 can be calculated using the timing cells.

For each of the data cells 5004 whose positions are thus determined, whether the vicinity of its center is black or white is determined. Black is made to correspond to, e.g., 1 while white is made to correspond to, e.g., 0. This makes it possible to recognize each data cell as binary data and decode the data cell.

Copying and transmission processing performed by the image processing apparatus 1001 as the first embodiment will be explained with reference to the flowchart in FIG. 7.

In step S100, a document is first read by the scanner 2061 on the basis of an operation of the operation unit 2011 by a user. In step S110, the scanner 2061 converts the pattern of light and dark on the document into electrical signals to form pieces of multilevel digital information. The pieces of digital information are temporarily accumulated in the RAM 2002 through the scanner I/F 2060, image bus 2051, and bus I/F. After that, the pieces of digital information are sequentially accumulated in the hard disk 2004 while being compressed by the image compression/expansion unit 2071 using, e.g., JBIG (in the case of black-and-white) or JPEG (in the case of color).

If reading of the whole area of the document is not completed in step S120, the flow returns to step S100 to continue to read the document. On the other hand, if it is determined in step S120 that reading of the whole area of the document is completed, the flow advances to step S130 to detect and identify an information symbol in the image data accumulated in the hard disk 2004. An identification method is as explained above. After the information symbol identification in step S130, it is determined in step S140 whether any information symbol is detected.

If an information symbol is detected in step S140, the flow advances to step S150 to decode the information symbol. In step S160, it is evaluated whether the result of decoding the information symbol has a prescribed data format. Whether the result has the prescribed data format can be determined on the basis of whether the data format of the result is a predetermined one (e.g., the result contains a prescribed character string such as "Document file system Ver.3 ID code," as in the example of the result of decoding the QR code in (a) in FIG. 5).

If it can be determined in step S160 that the information symbol has the prescribed data format, the flow advances to step S170. In step S170, the whole of the identified information symbol is masked in white and deleted from the image data. After that, the flow returns to step S140 to evaluate whether there is any more information symbol. On the other hand, if the data format is not the prescribed one in step S160, it is determined that the data format is not the predetermined one, and the flow returns to step S140 without deleting the information symbol. A determination to that effect is made if, for example, the information symbol is a QR code used for the explanation in the document, as in the example of the result of decoding the QR code in (b) in FIG. 5. If no more undecoded information symbol is detected in step S140, it is determined that there is no more QR code in the target document, and the flow advances to step S180.

Figure 4A:
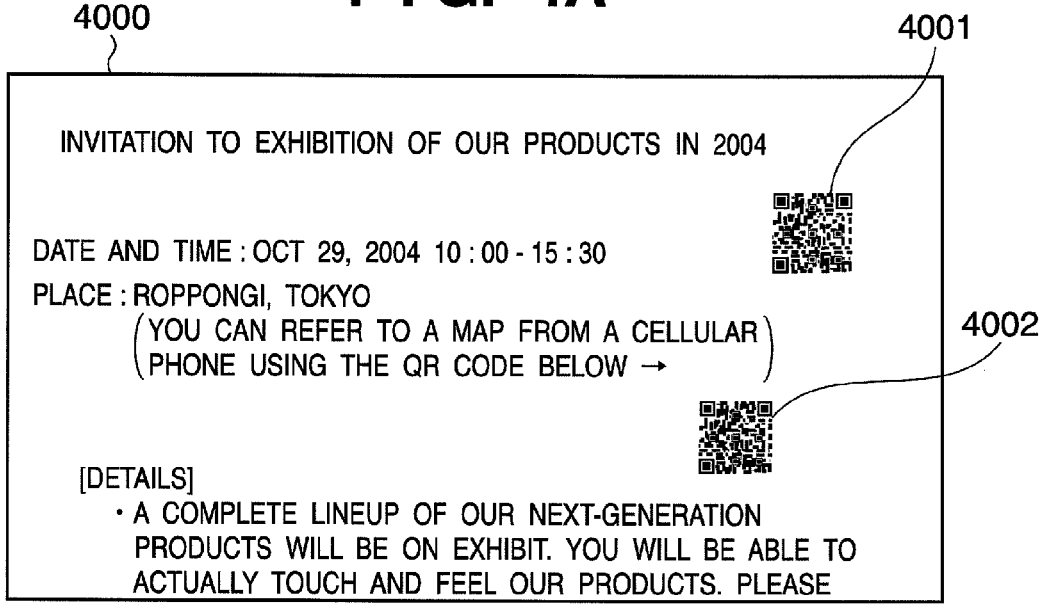
FIG. 4A is a view of a document sample with a printed two-dimensional code (QR code) containing a document ID in the image processing apparatus of this embodiment.

In step S180, copying or image transmission is performed in accordance with the details of the operation designated with the operation unit 2011 by the user before reading the document. This makes it possible to delete, from a document containing information symbols as shown in FIG. 4A, only an information symbol as a document ID while leaving an information symbol used to explain the document undeleted, as in FIG. 4B, and perform copying or image transmission. In other words, according to this embodiment, the effort of deleting an information symbol from a read image can be reduced.

Note that a method of deleting an information signal is not limited to one described above, i.e., deleting the whole of an information symbol with a white mask. Various modifications such as partial deletion and replacement with other information may be used. Any method will work as long as information indicated by an information symbol is unanalyzable.

Second Embodiment

Copying and transmission processing performed by an image processing apparatus as a second embodiment of the present invention will be explained with reference to the flowchart in FIG. 8. The difference from the first embodiment lies in that an indication is provided to prompt for an input as to whether to delete an information symbol. An explanation of the same portions as those of the first embodiment will be omitted.

Figure 7:
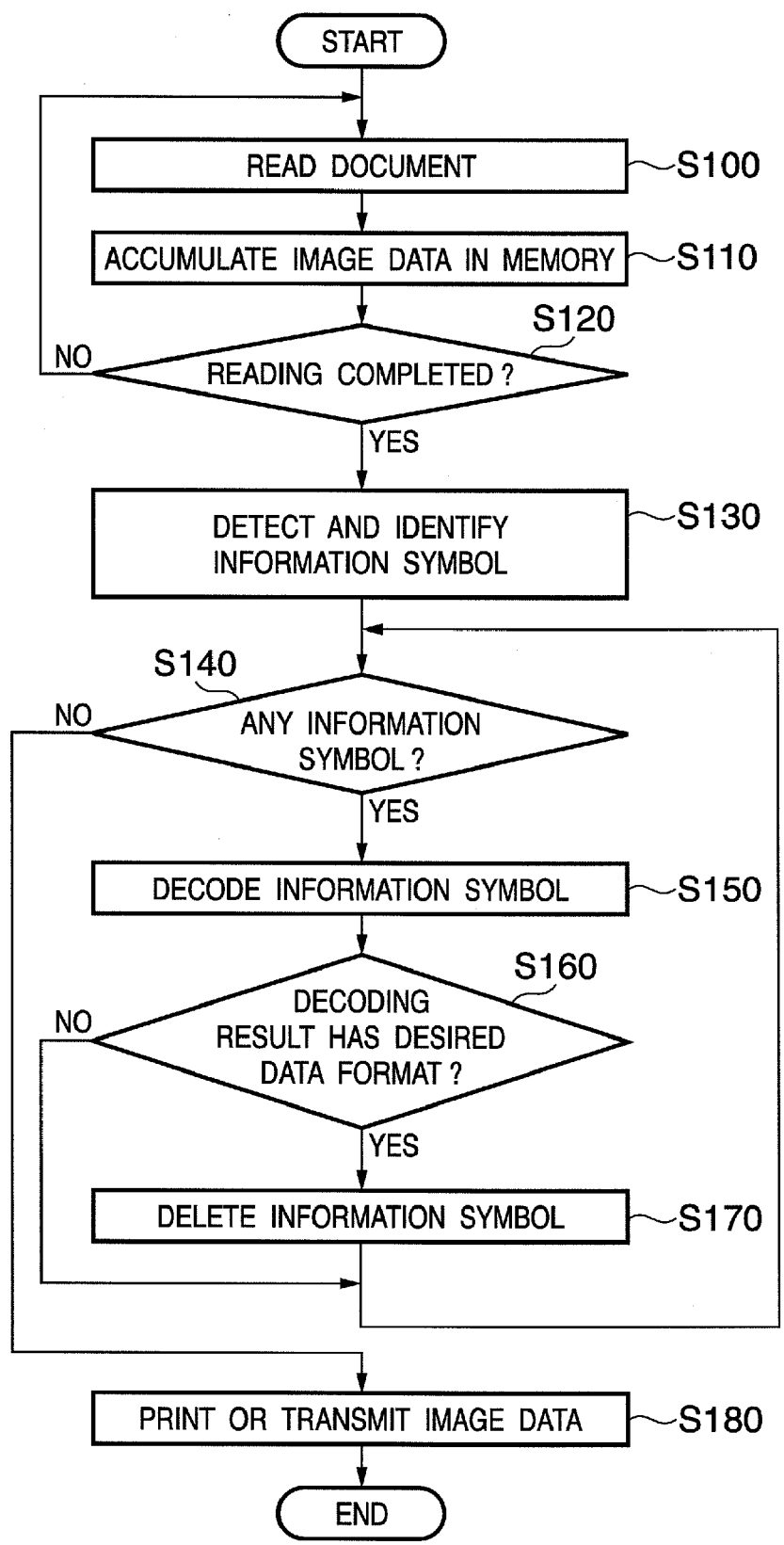
FIG. 7 is a flowchart showing the operation when copying or transmitting a document in the image processing apparatus of the first embodiment.
Figure 8:
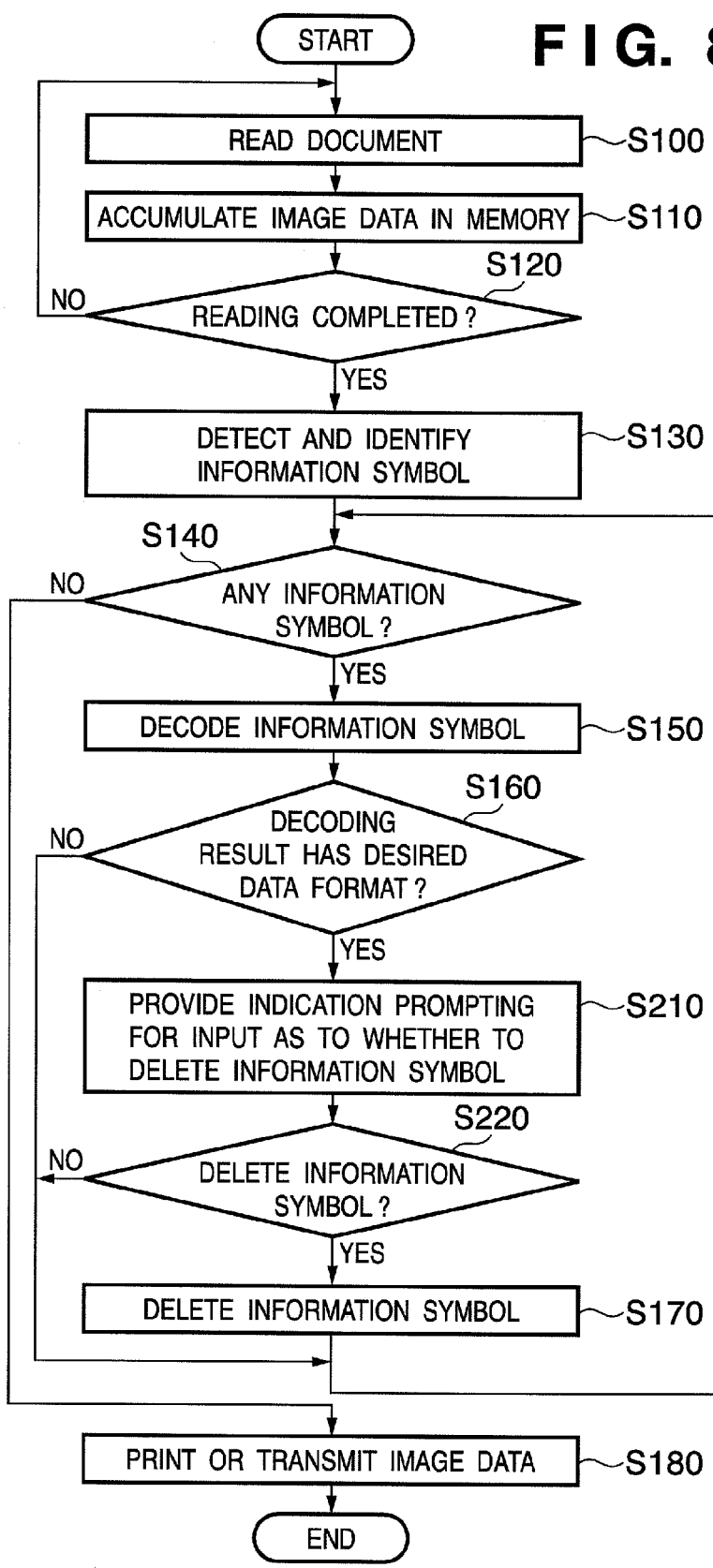
FIG. 8 is a flowchart showing the operation when copying or transmitting a document in an image processing apparatus of a second embodiment.

In FIG. 8, processes in steps S100 to S160 are the same as those in FIG. 7 explained in the first embodiment. If it can be determined in step S160 that an information symbol has a prescribed data format, the flow advances to step S210. In step S210, an indication prompting for an input as to whether to delete an information symbol is displayed on a display unit included in an operation unit 2011. The flow advances to step S220 to determine on the basis of a user operation from the operation unit 2011 whether to delete an information symbol. If a user inputs an instruction to delete an information symbol with the operation unit 2011 in step S220, the flow advances to step S170. On the other hand, if the user inputs an instruction not to delete an information symbol with the operation unit 2011 in step S220, the flow returns to step S140. If it can be determined in step S160 that an information symbol does not have the prescribed data format, the flow returns to step S140. The rest of the processing is the same as that of the first embodiment.

As described above, this embodiment provides an opportunity for a user to determine whether to delete an information symbol. This makes it possible to delete, from a document containing information symbols as shown in FIG. 4A, only an information symbol as a document ID while leaving an information symbol used to explain the document undeleted, as in FIG. 4B, and perform copying or image transmission, after user confirmation.

Third Embodiment

Figure 9:
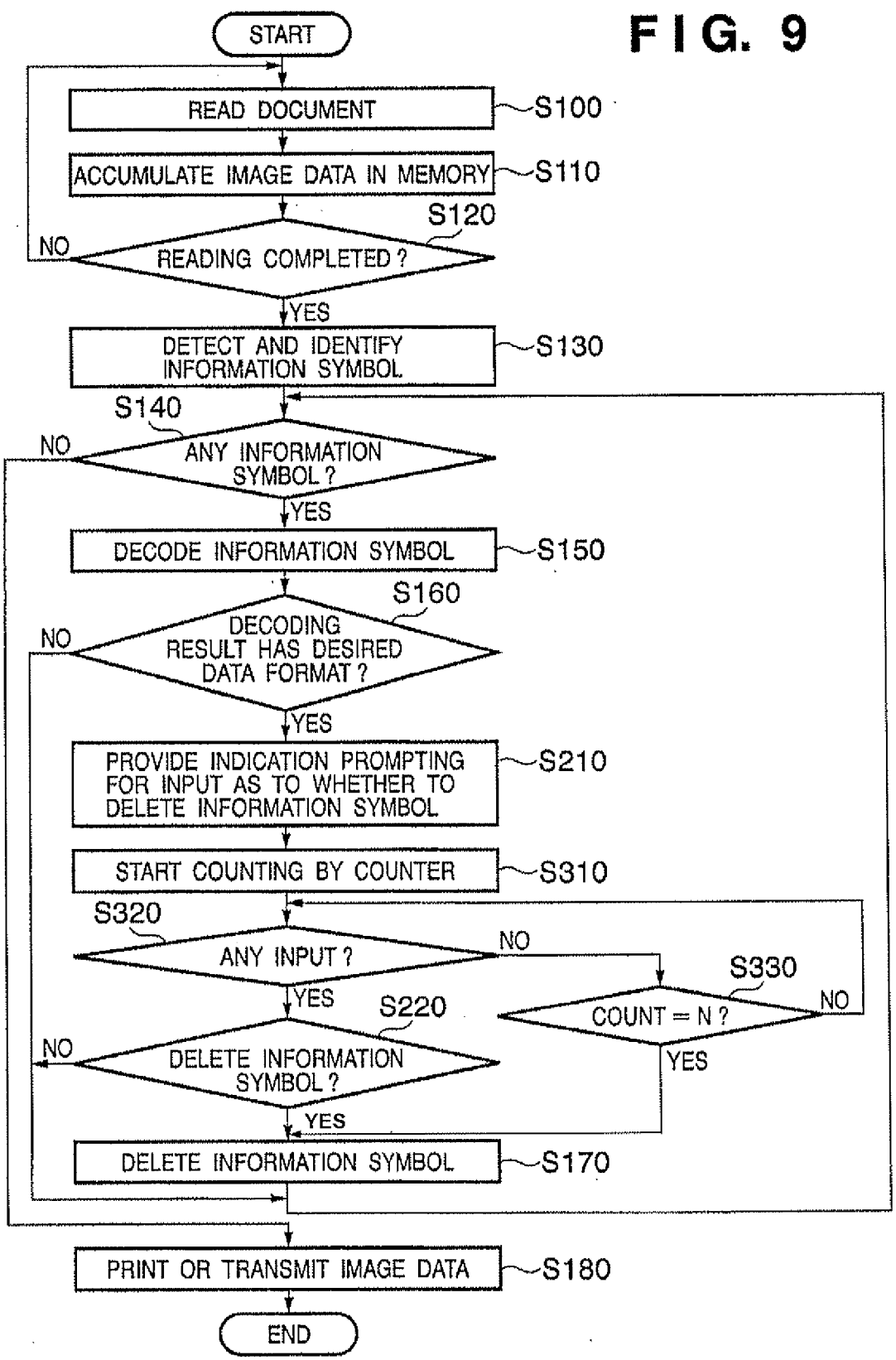
FIG. 9 is a flowchart showing the operation when copying or transmitting a document in an image processing apparatus of a third embodiment.

Copying and transmission processing performed by an image processing apparatus as a third embodiment of the present invention will be explained with reference to the flowchart in FIG. 9. The difference from the second embodiment lies in that a lapse of a prescribed time after an indication inquiring whether to delete an information symbol is provided is detected, and an information symbol is automatically deleted. Since the other processes are the same as those of the second embodiment, the same processes are denoted by the same reference numerals, and an explanation thereof will be omitted.

Steps S100 to S210 are the same as those in the second embodiment. In step S210, an indication prompting for an input as to whether to delete an information symbol is provided on a display unit included in an operation unit 2011. In step S310, a timer counter is started. In step S320, it is determined whether there is any user operation from the operation unit 2011. If there is any user operation in step S320, the flow advances to step S220. Step S220 and subsequent steps are the same as those in the second embodiment. On the other hand, if there is no user operation in step S320, the flow advances to step S330 to evaluate whether the count of the timer counter has reached a predetermined number N.

If the count of the timer has not reached N in step S330, the flow returns to step S320. On the other hand, if the count of the timer has reached N in step S330, the flow advances to step S170. The rest of the processing is the same as that of the second embodiment. This makes it possible to delete, from a document containing information symbols as shown in FIG. 4A, only an information symbol as a document ID while leaving an information symbol used to explain the document undeleted, as in FIG. 4B, and perform copying or image transmission if deletion is selected at the time of user confirmation. Even if deletion is not selected at the time of user confirmation, it is possible to delete only an information symbol as a document ID while leaving an information symbol used to explain the document undeleted, as in FIG. 4B, and perform copying or image transmission after a given time.

Fourth Embodiment

Figure 10:
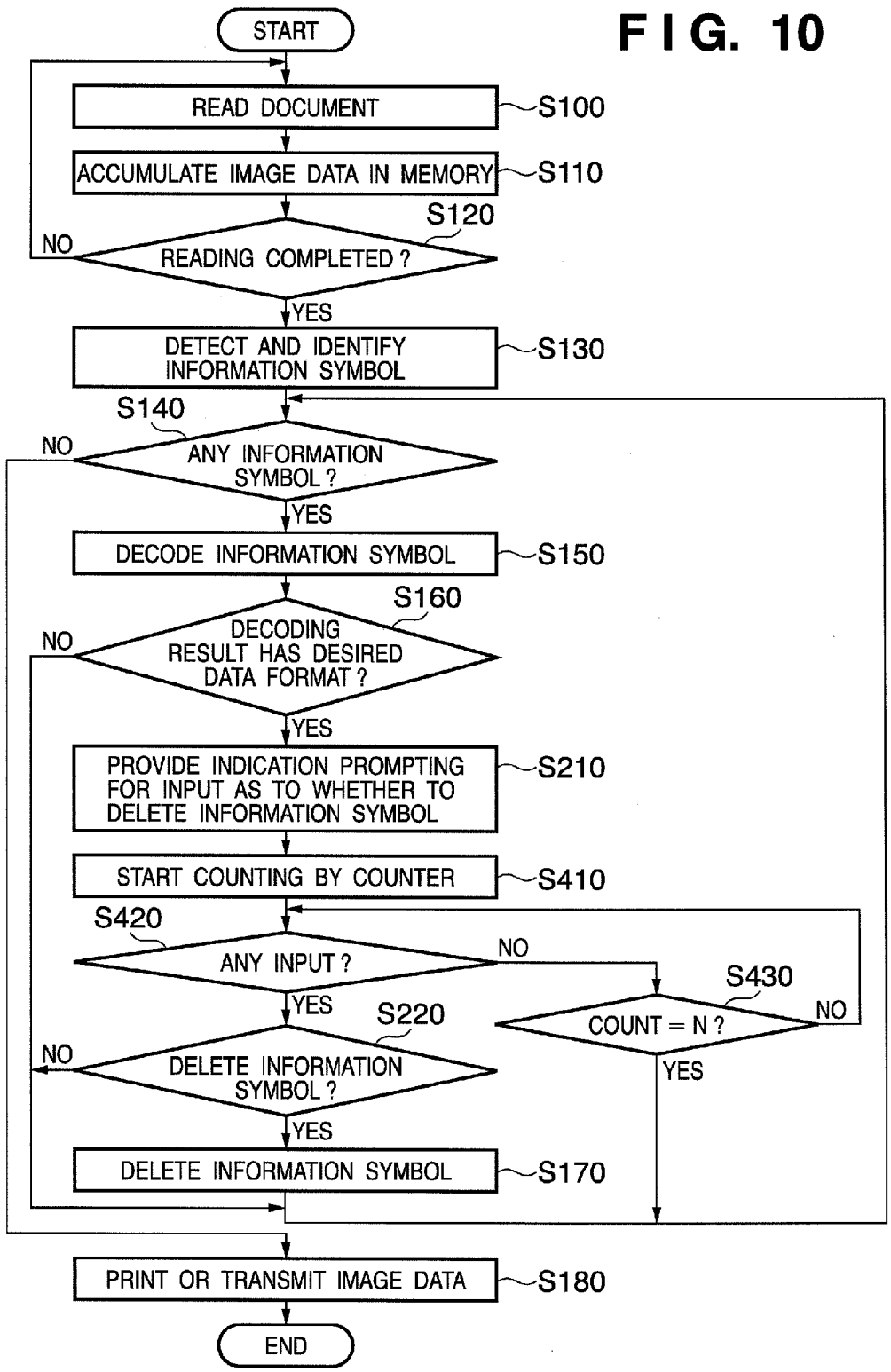
FIG. 10 is a flowchart showing the operation when copying or transmitting a document in an image processing apparatus of a fourth embodiment.

Copying and transmission processing performed by an image processing apparatus as a fourth embodiment of the present invention will be explained with reference to the flowchart in FIG. 10.

The difference from the second embodiment lies in that a lapse of a prescribed time after an indication inquiring whether to delete an information symbol is provided is detected, and deletion of an information symbol is canceled. Since the other processes are the same as those of the second embodiment, the same processes are denoted by the same reference numerals, and an explanation thereof will be omitted.

Steps S100 to S210 are the same as those in the second embodiment. In step S210, an indication prompting for an input as to whether to delete an information symbol is provided on a display unit included in an operation unit 2011. In step S410, a timer counter is started. In step S420, it is determined whether there is any user operation from the operation unit 2011. If there is any user operation in step S420, the flow advances to step S220. Step S220 and subsequent steps are the same as those in the second embodiment. On the other hand, if there is no user operation in step S420, it is evaluated whether the count of the timer counter has reached a predetermined number N in step S430. If the count of the timer has not reached N in step S430, the flow returns to step S420. On the other hand, if the count of the timer has reached N in step S430, the flow advances to step S140. The rest of the processing is the same as that of the second embodiment. This makes it possible to delete, from a document containing information symbols as shown in FIG. 4A, only an information symbol as a document ID while leaving an information symbol used to explain the document undeleted, as in FIG. 4B, and perform copying or image transmission if deletion is selected at the time of user confirmation. If deletion is not selected at the time of user confirmation, no information symbol is deleted, and image data is copied and output, as in FIG. 4A, or an image is transmitted, after a given time.

Fifth Embodiment

Figure 11:
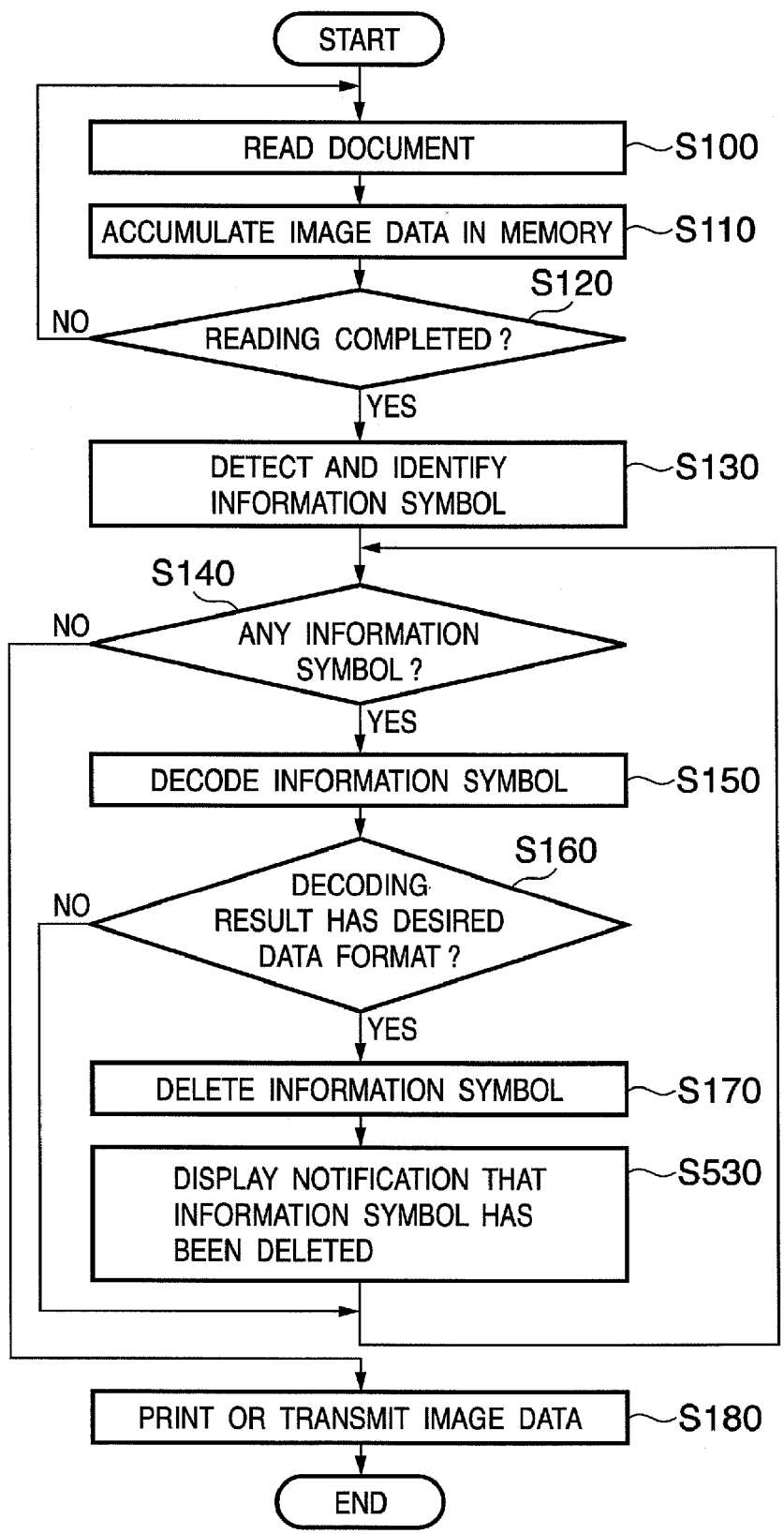
FIG. 11 is a flowchart showing the operation when copying or transmitting a document in an image processing apparatus of a fifth embodiment.

Copying and transmission processing performed by an image processing apparatus as a fifth embodiment of the present invention will be explained with reference to the flowchart in FIG. 11.

The difference from the first embodiment lies in that a notification of deletion of an information symbol is made. Since the other processes are the same as those of the first embodiment, the same processes are denoted by the same reference numerals, and an explanation thereof will be omitted.

Steps S100 to S170 are the same as those in the first embodiment. In step S170, an information symbol with the same data format as a desired one is deleted. After that, a notification that the information symbol has been deleted is displayed on a display unit included in an operation unit 2011 in step S530, and the flow returns to step S140. The rest of the processing is the same as that of the first embodiment. This makes it possible for a user to know that only an information symbol as a document ID is automatically deleted from a document containing information symbols as shown in FIG. 4A while leaving an information symbol used to explain the document undeleted, as in FIG. 4B.

Sixth Embodiment

Figure 12:
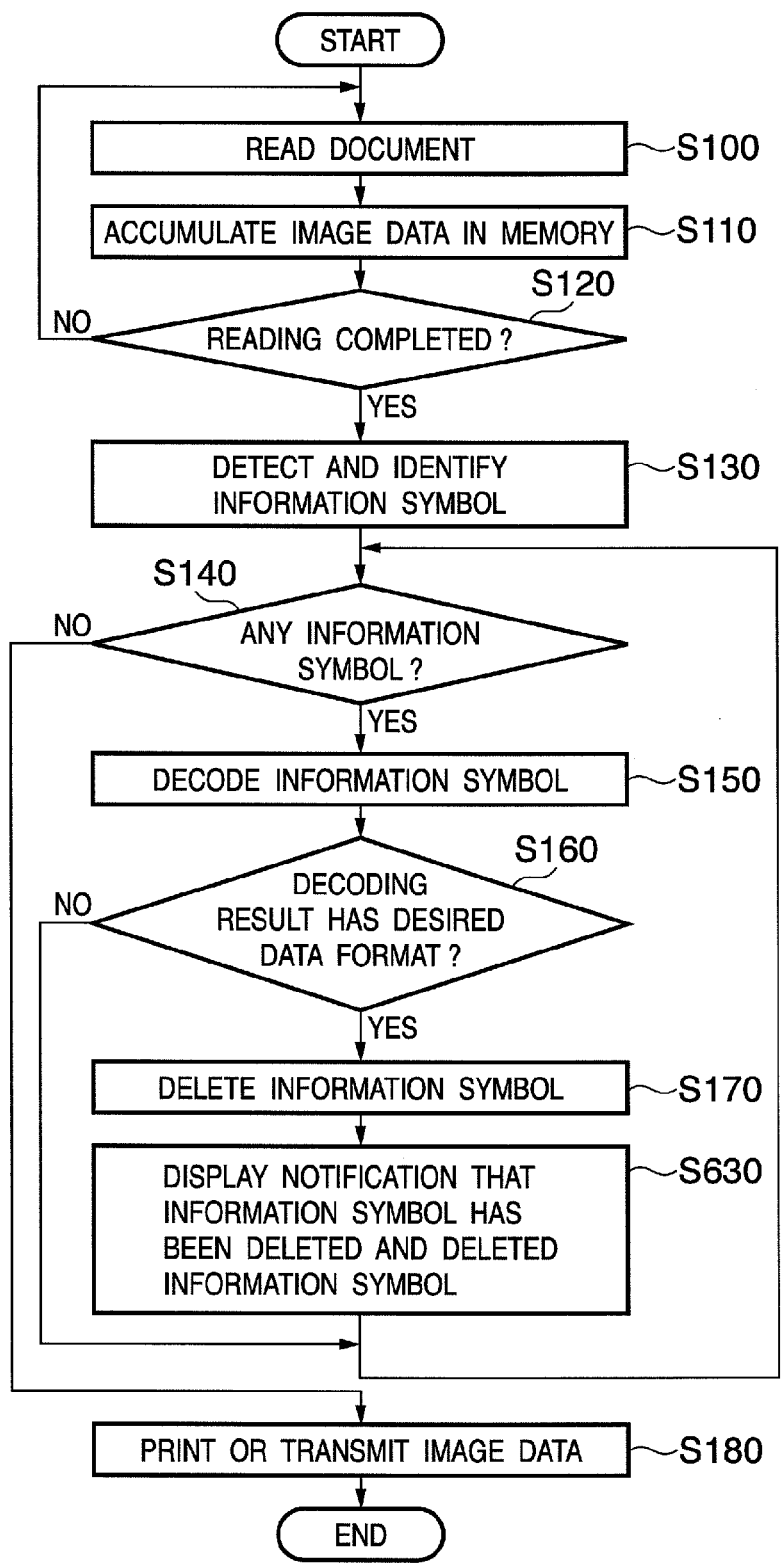
FIG. 12 is a flowchart showing the operation when copying or transmitting a document in an image processing apparatus of a sixth embodiment.

Copying and transmission processing performed by an image processing apparatus as a sixth embodiment of the present invention will be explained with reference to the flowchart in FIG. 12.

The difference from the first embodiment lies in that a notification of deletion of an information symbol and the deleted information symbol is made. Since the other processes are the same as those of the first embodiment, the same processes are denoted by the same reference numerals, and an explanation thereof will be omitted.

Steps S100 to S170 are the same as those in the first embodiment. In step S170, an information symbol with the same data format as a prescribed one is deleted. After that, a notification that the information symbol has been deleted and the deleted information symbol are displayed on a display unit included in an operation unit 2011 in step S630, and the flow returns to step S140. The rest of the processing is the same as that of the first embodiment. This makes it possible for a user to know that only an information symbol as a document ID is automatically deleted from a document containing information symbols as shown in FIG. 4A while leaving an information symbol used to explain the document undeleted, as in FIG. 4B.

Seventh Embodiment

Figure 13:
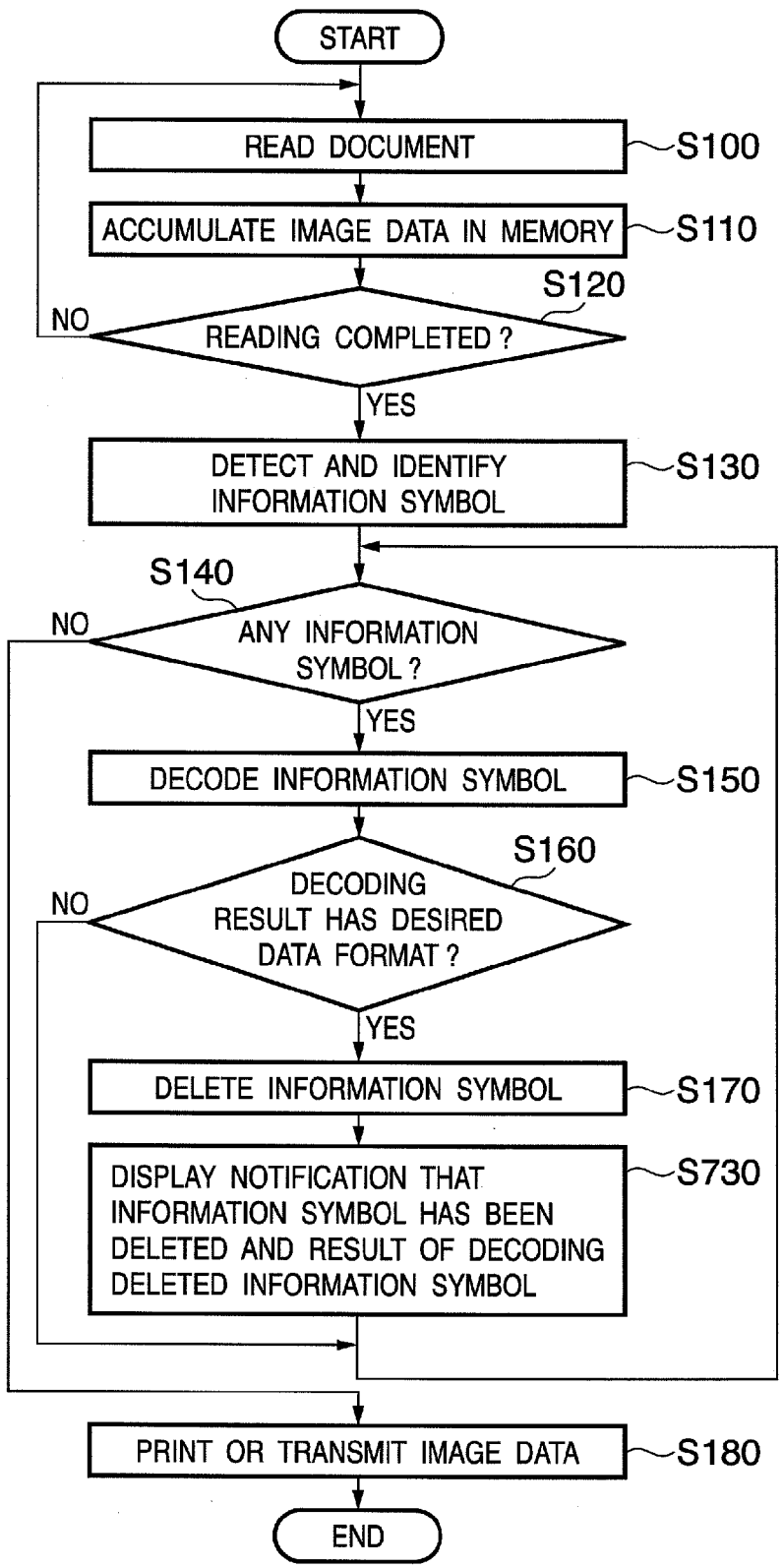
FIG. 13 is a flowchart showing the operation when copying or transmitting a document in an image processing apparatus of a seventh embodiment.

Copying and transmission processing performed by an image processing apparatus as a seventh embodiment of the present invention will be explained with reference to the flowchart in FIG. 13.

The difference from the first embodiment lies in that a notification of deletion of an information symbol and a result of decoding the deleted information symbol is made. Since the other processes are the same as those of the first embodiment, the same processes are denoted by the same reference numerals, and an explanation thereof will be omitted.

Steps S100 to S170 are the same as those in the first embodiment. In step S170, an information symbol with the same data format as a desired one is deleted. After that, a notification that the information symbol has been deleted and a result of decoding the deleted information symbol are displayed on a display unit included in an operation unit 2011 in step S730, and the flow returns to step S140. The rest of the processing is the same as that of the first embodiment. This makes it possible for a user to know that only an information symbol as a document ID is automatically deleted from a document containing information symbols as shown in FIG. 4A while leaving an information symbol used to explain the document undeleted, as in FIG. 4B, and know a result of decoding the deleted information symbol.

Eighth Embodiment

Figure 14:
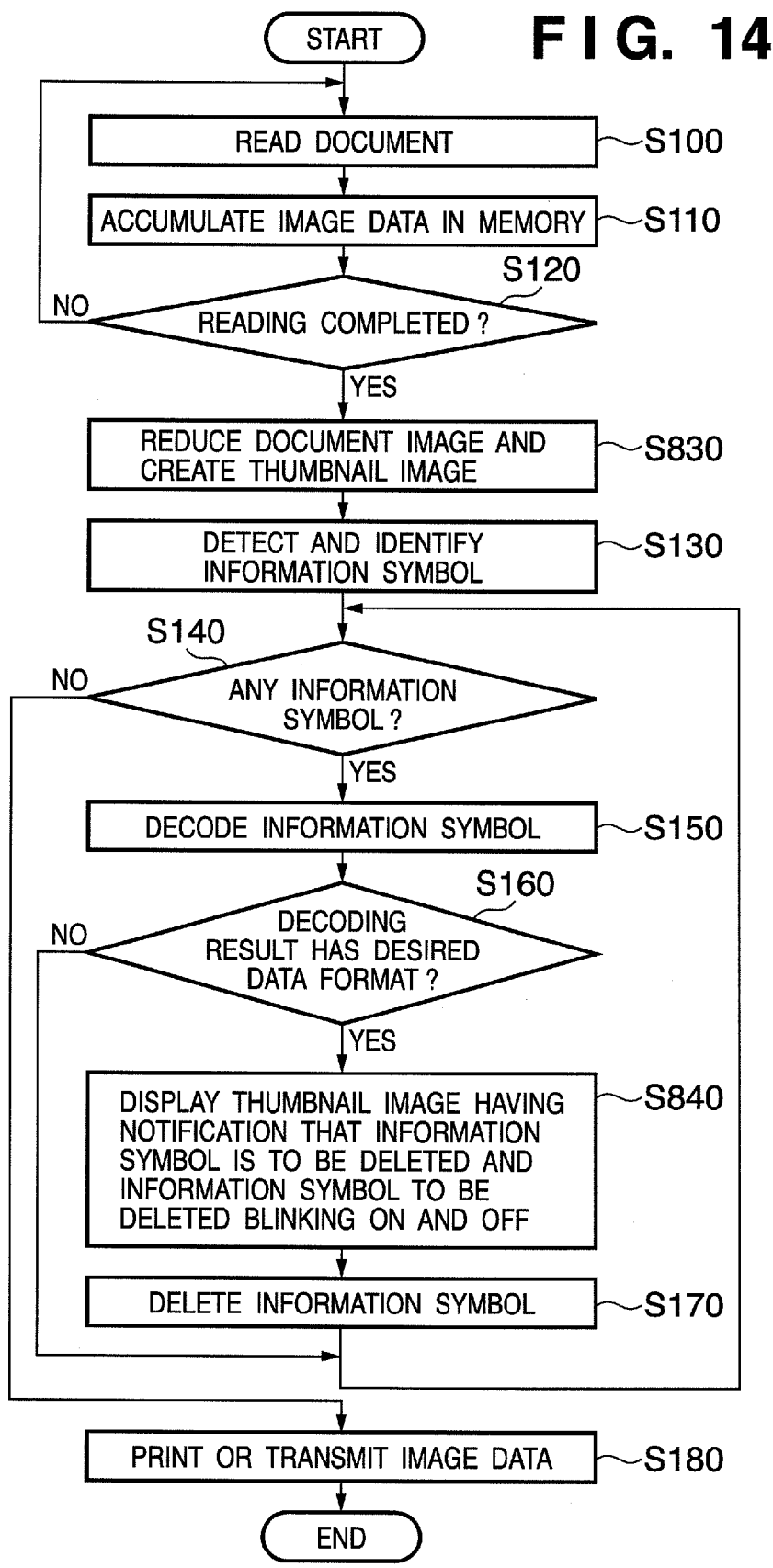
FIG. 14 is a flowchart showing the operation when copying or transmitting a document in an image processing apparatus of an eighth embodiment.

Copying and transmission processing performed by an image processing apparatus as an eighth embodiment of the present invention will be explained with reference to the flowchart in FIG. 14.

The difference from the first embodiment lies in that a notification of deletion of an information symbol and the deleted information symbol are displayed in a thumbnail image. Since the other processes are the same as those of the first embodiment, the same processes are denoted by the same reference numerals, and an explanation thereof will be omitted.

Steps S100 to S120 are the same as those in the first embodiment. If reading of the whole area of a document is completed in step S120, a scanner image processing unit 2062 reduces image data of a read document to create a thumbnail image in step S830 for later display on an operation unit 2011. The flow advances to step S130. The processes in steps S130 to S160 are the same as those in the first embodiment. Steps S100 to S160 are the same as those in the first embodiment. If it can be determined in step S160 that an information symbol has a prescribed data format, a thumbnail image having a notification that the information symbol is to be deleted and the information symbol to be deleted blinking on and off is displayed on a display unit included in the operation unit 2011 in step S840. The information symbol is deleted in step S170.

The rest of the processing is the same as that of the first embodiment. This makes it possible for a user to know that only an information symbol as a document ID is automatically deleted from a document containing information symbols as shown in FIG. 4A while leaving an information symbol used to explain the document undeleted, as in FIG. 4B. It is also possible to easily know a deleted information symbol on a thumbnail.

Note that as an image transmission method in the first to eighth embodiments, any method may be used. Facsimile transmission may be performed by a facsimile transmission component 3006 or network transmission may be performed by a file server transmission component 3007. Alternatively, e-mail transmission may be performed by a mail transmission component 3008 or box transmission may be performed by a box component 3009.

Ninth Embodiment

A method of associating in advance whether to automatically delete an information symbol as a document ID with an image transmission destination using an address book in an image processing apparatus as a ninth embodiment will be explained.

More specifically, this embodiment has means for associating in advance whether to delete a document ID with a destination in an address book for network transmission or FAX transmission. For this reason, whether to delete a document ID is automatically determined depending on a transmission destination.

FIG. 15 is a conceptual view of a screen when setting a destination for a use condition in the image processing apparatus of this embodiment. Reference numeral 401 denotes an input screen. Reference numeral 402 denotes an input field for the destination name of a recipient. Reference numeral 403 denotes an input field for an e-mail address corresponding to the destination name. Reference numeral 404 denotes a setting input field for setting in advance whether to leave a document ID attached to an image to be transmitted to the recipient, if any. Reference numeral 405 denotes an input field for a comment on the destination name. Inputting of a comment is optional. Reference numeral 406 denotes a button to be pressed if an input setting is OK. Reference numeral 407 denotes a button to be pressed to cancel an input setting.

Figure 16:
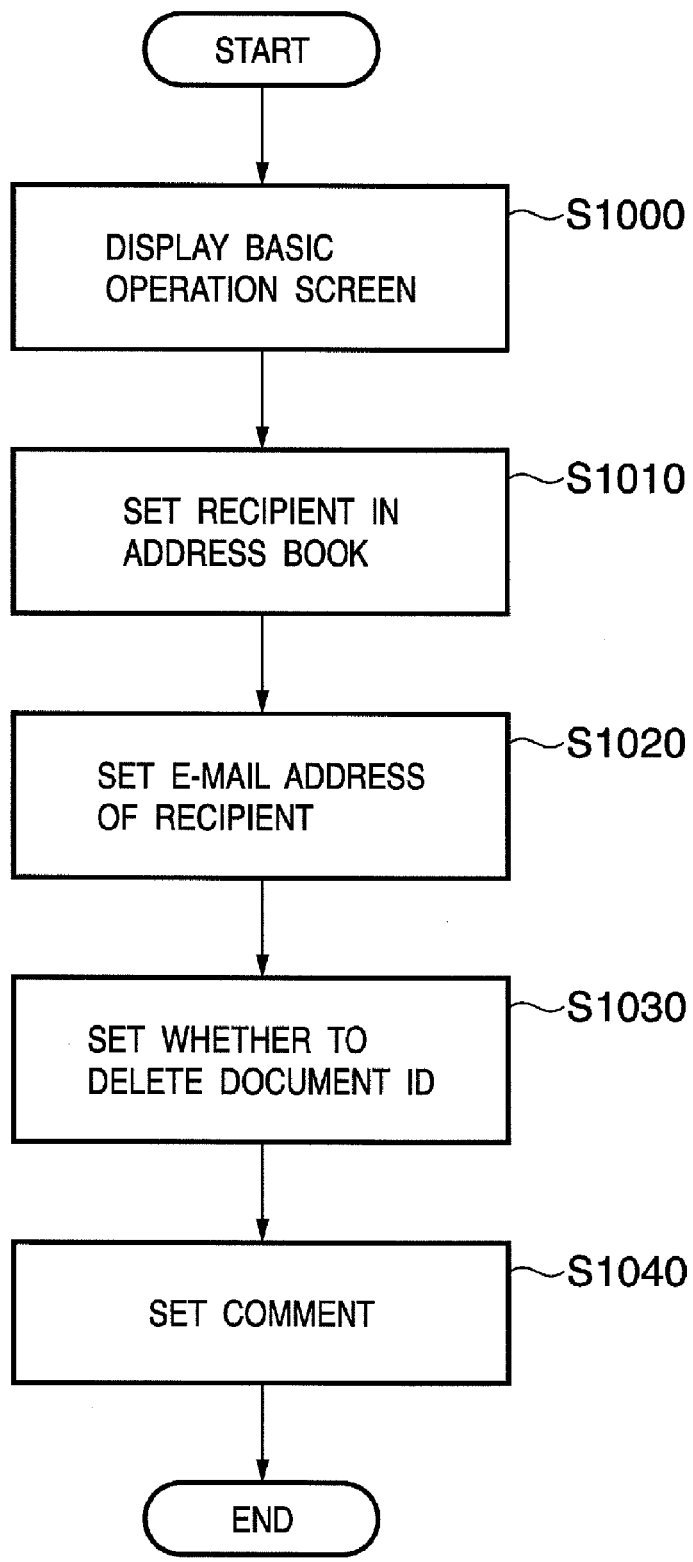
FIG. 16 is a flowchart when setting an address book in the image processing apparatus of the ninth embodiment.

FIG. 16 is a flowchart showing the operation when setting various types of parameters in the screen in FIG. 15. A basic operation screen is first displayed (S1000), and the destination of a recipient is input and set in an address book (S1010). The e-mail address of the recipient is input and set (S1020). Whether to delete the document ID of a document to be transmitted to the recipient is set (S1030). A comment is input in step S1040.

Figure 17:
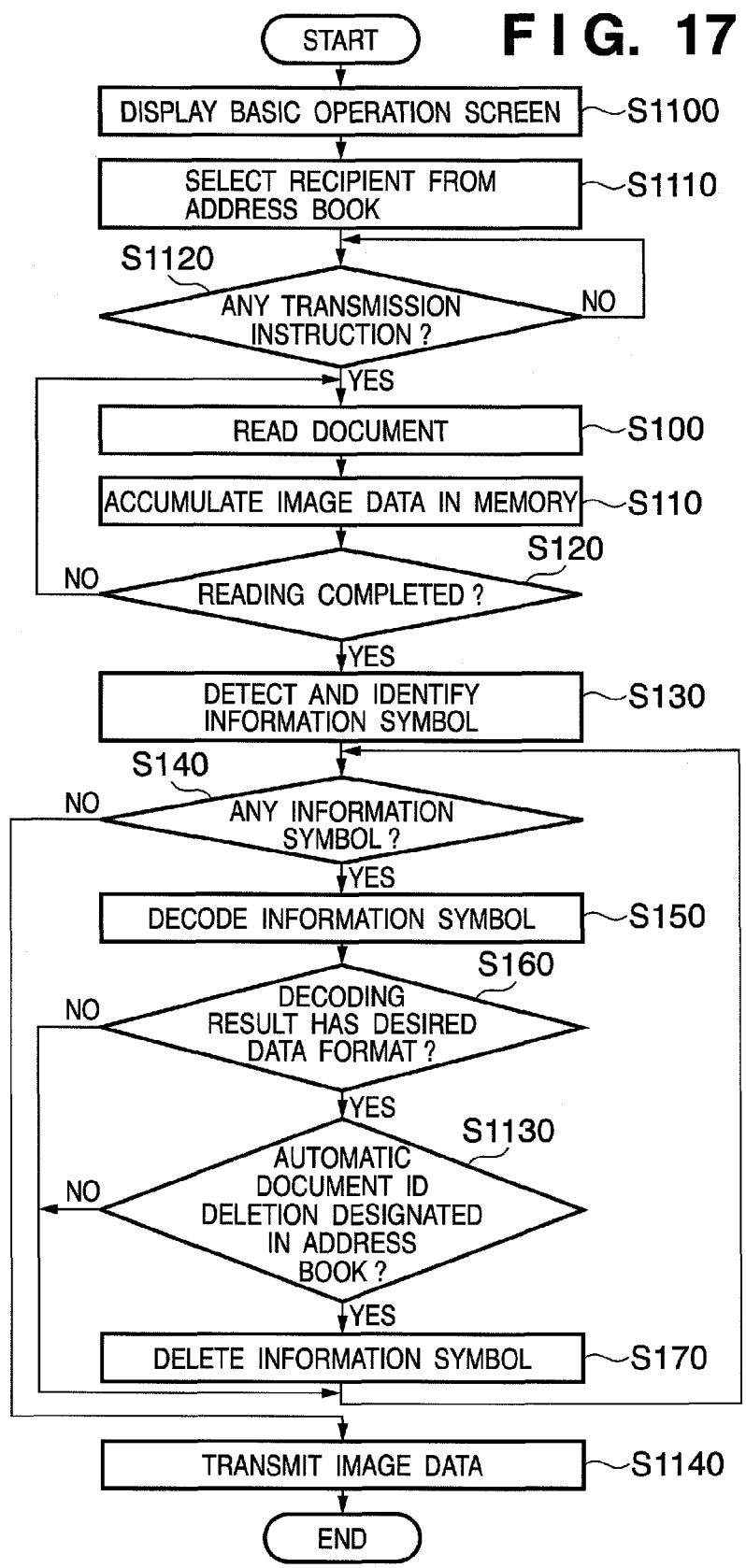
FIG. 17 is a flowchart when selecting an address in an address book and transmitting an e-mail message in the image processing apparatus of the ninth embodiment.

FIG. 17 is a flowchart when selecting one of mail addresses set in an address book, reading a document, and transmitting the read image. A basic operation screen is first displayed in response to an operation of an operation unit 2011 by a user (S1100). One is selected from recipient destinations in the address book (S1110). A transmission instruction is waited for (S1120). Upon receipt of a transmission instruction, a scanner 2061 reads a document in step S100. The scanner 2061 converts the pattern of light and dark on the document into electrical signals to form pieces of multilevel digital information. The pieces of digital information are sequentially accumulated in a hard disk 2004 in step S110. If reading of the whole area of the document is not completed in step S120, the flow returns to step S100 to continue to read the document. On the other hand, if reading of the whole area of the document is completed in step S120, an information symbol is detected and identified in the image data accumulated in the hard disk 2004 in step S130. An identification method is as explained above. After the information symbol identification in step S130, it is determined in step S140 whether any information symbol is detected. If an information symbol is detected in step S140, the information symbol is decoded in step S150, and it is evaluated in step S160 whether the result of decoding the information symbol has a desired data format. If it can be determined in step S160 that the information symbol has the desired data format, it is determined in step S1130 whether automatic document ID deletion is associated with the designated transmission destination. If automatic deletion is not associated in step S1130, the flow returns to step S1140. On the other hand, if automatic deletion is associated in step S1130, the information symbol is deleted from the image data by, e.g., masking the whole of the information symbol in white in step S170.

After that, the flow returns to step S140 to evaluate whether there is any more information symbol. On the other hand, if the data format is not the desired one in step S160, it is determined that the data format is not a predetermined one, and the flow returns to step S140. If no more information symbol is detected in step S140, it is determined that there is no more QR code in the target document, and the flow advances to step S180. In step S180, image transmission is performed in accordance with the details of the operation designated with the operation unit 2011 by the user before reading the document.

Figure 4B:
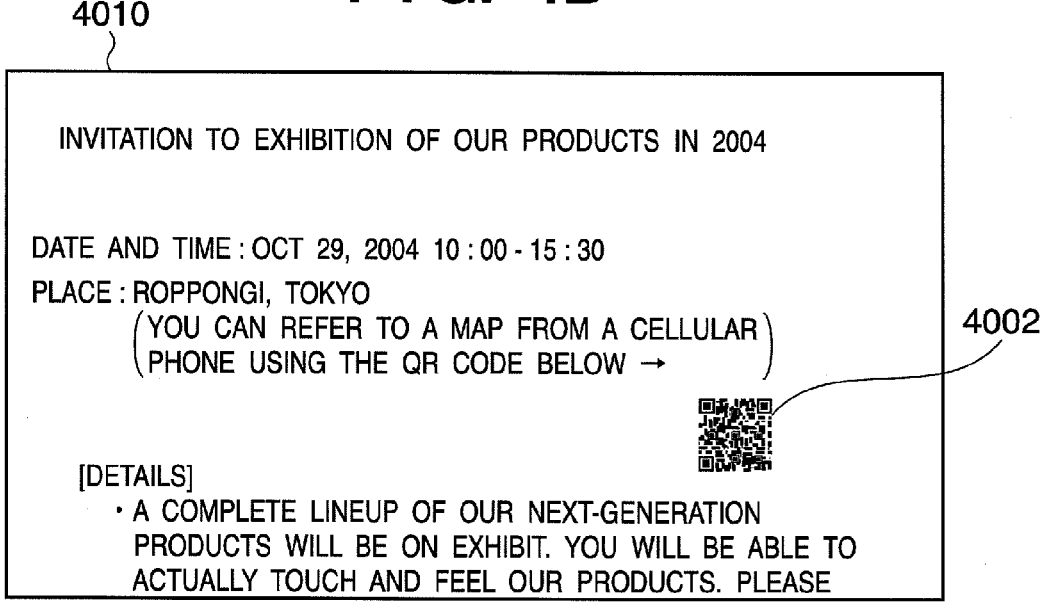
FIG. 4B is a view of an example of an output obtained by copying the document in FIG. 4A.

This makes it possible to automatically delete, from a document containing information symbols as shown in FIG. 4A, only an information symbol as a document ID while leaving an information symbol used to explain the document undeleted, as in FIG. 4B, and perform image transmission. This embodiment has explained a case where a destination set in an address book is one for e-mail transmission. However, a destination may be one for FAX transmission or file server transmission.

Tenth Embodiment

Figure 18:
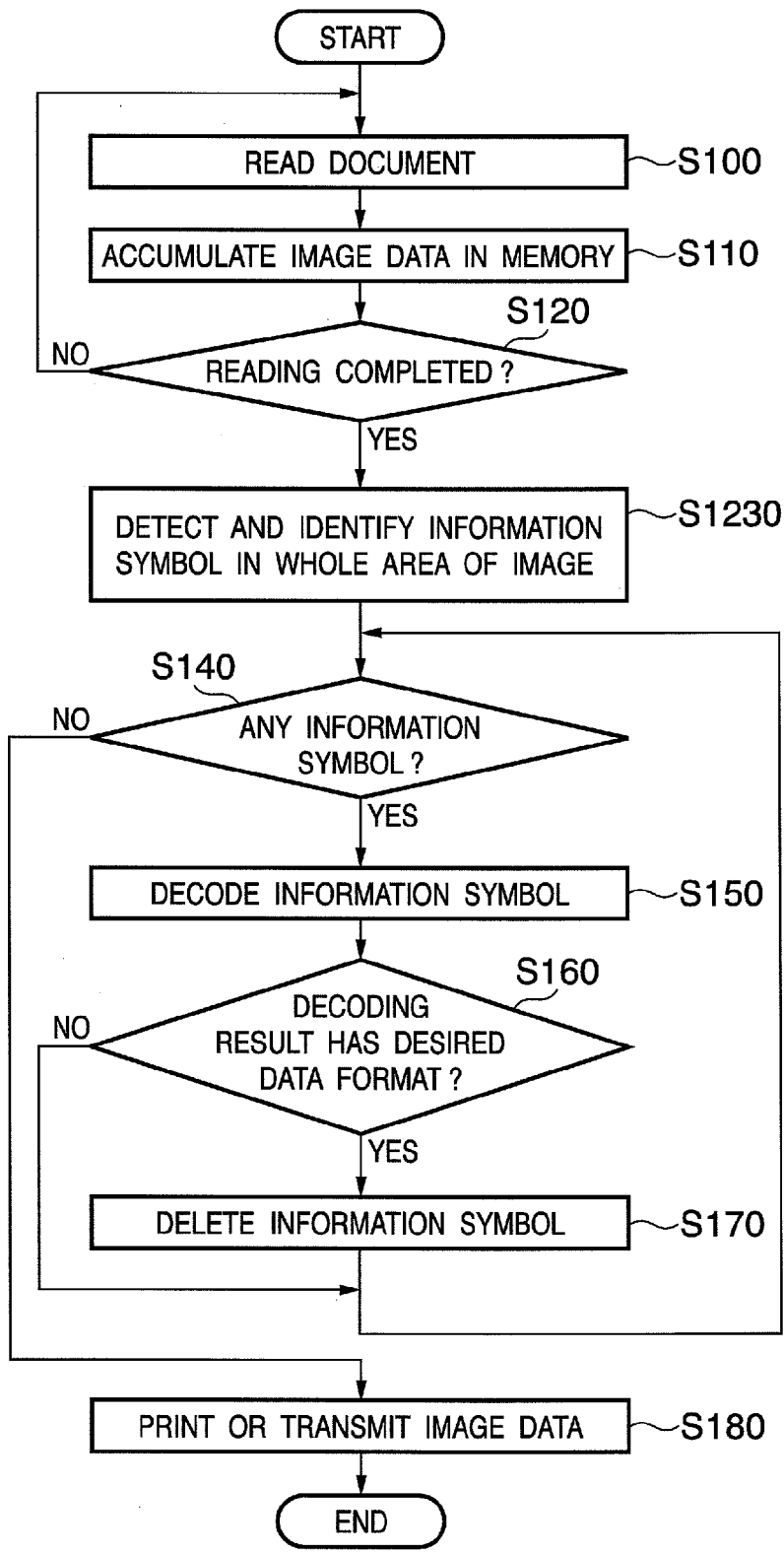
FIG. 18 is a flowchart showing the operation when copying or transmitting a document in an image processing apparatus of a tenth embodiment.

Copying and transmission processing performed by an image processing apparatus as a tenth embodiment will be explained with reference to the flowchart in FIG. 18. The difference from the first embodiment lies only in that step S130 is replaced with step S1230. An explanation of the rest, the same portions as those of the first embodiment will be omitted. Steps S100 to S120 are the same. If reading of the whole area of a document is completed in step S120, an information symbol is detected and identified in the whole area of image data, having been read and accumulated in a hard disk 2004 in step S100, in step S1230. As described above, identification means may take the whole area of a read image as a detection area. This makes it possible to properly identify an information symbol indicating a document ID in a document containing information symbols as shown in FIG. 4A wherever the information symbol is located. It is also possible to automatically delete only an information symbol as a document ID while leaving an information symbol used to explain the document undeleted, as in FIG. 4B, and perform copying or image transmission.

Eleventh Embodiment

Figure 19:
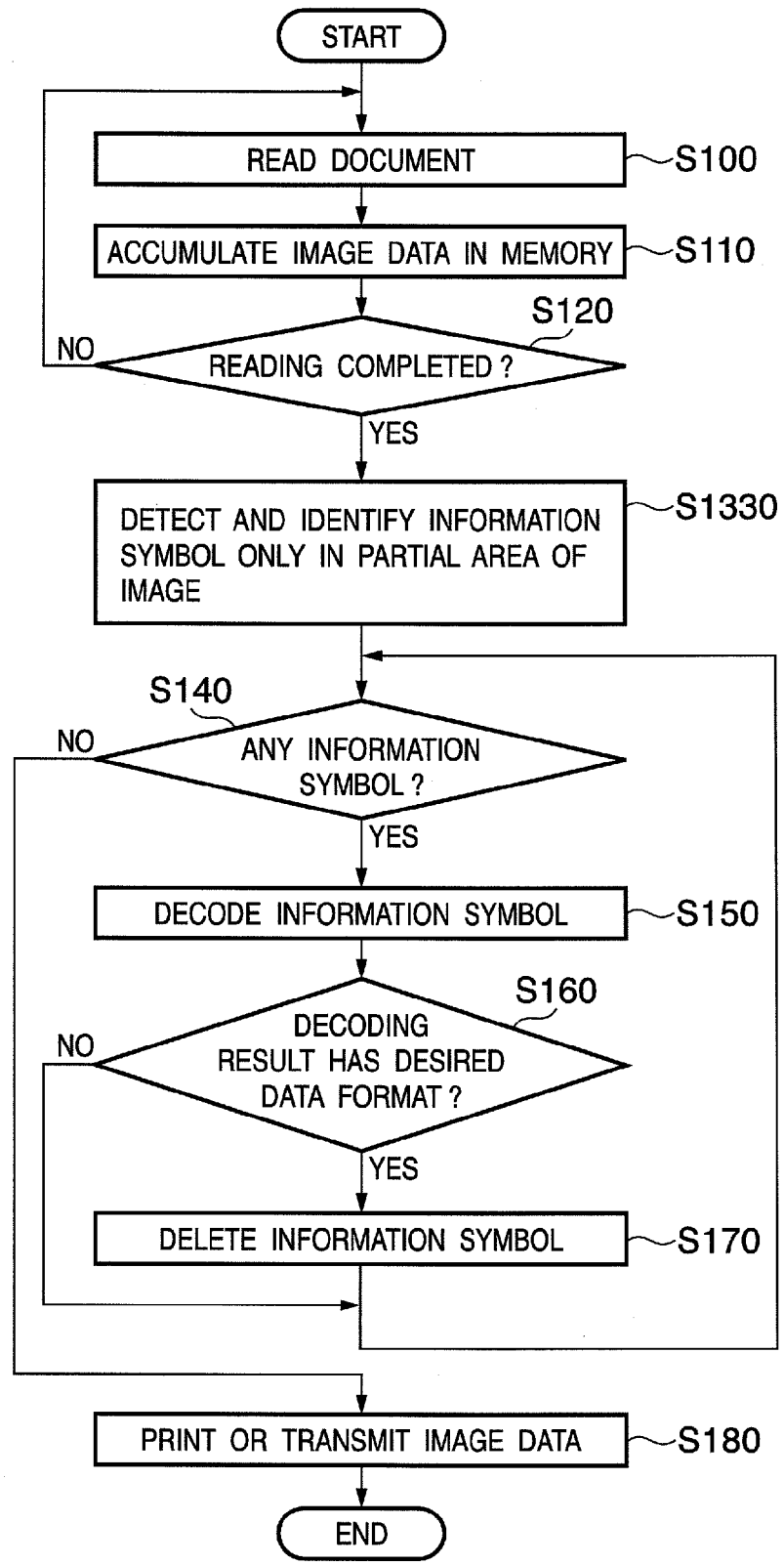
FIG. 19 is a flowchart showing the operation when copying or transmitting a document in an image processing apparatus of an eleventh embodiment.

Copying and transmission processing performed by an image processing apparatus as an eleventh embodiment will be explained with reference to the flowchart in FIG. 19. The difference from the first embodiment lies only in that step S130 is replaced with step S1330. An explanation of the rest, the same portions as those of the first embodiment will be omitted. Steps S100 to S120 are the same. If reading of the whole area of a document is completed in step S120, an information symbol is detected and identified in a partial area of image data, having been read and accumulated in a hard disk 2004 in step S100, in step S1330.

As described above, identification means may take a partial area of a read image as a detection area. This makes it possible to detect and identify an information symbol indicating a document ID at high speed in a document containing information symbols as shown in FIG. 4A if such an information symbol is located only at a corner of the document. It is also possible to automatically delete only an information symbol as a document ID while leaving an information symbol used to explain the document undeleted, as in FIG. 4B, and perform copying or image transmission.

Other Embodiment

The embodiments of the present invention have been described in detail above. The present invention may be applied to a system composed of a plurality of devices or an apparatus composed of a single device.

Note that the present invention is also accomplished by directly or remotely supplying a program which implements the functions of the embodiments to the system or apparatus and reading out and executing the code of the supplied program by the system or apparatus. Accordingly, a program code itself installed in a computer to implement the functional processing of the present invention by the computer is also included in the technical scope of the present invention.

In this case, the form of the program is not particularly limited, and an object code, a program to be executed by an interpreter, script data to be supplied to an OS, or the like may be used as long as it has the program function.

There are various types of recording media for supplying a program. For example, a floppy (registered trademark) disk, hard disk, optical disk, magneto-optical disk, MO, CD-ROM, CD-R, CD-RW, magnetic tape, nonvolatile memory card, ROM, DVD (DVD-ROM or DVD-R), or the like may be used.

The program of the present invention can also be supplied by accessing a home page on the Internet using a browser of a client computer and downloading the program itself or a compressed file containing an automatic installation function from the home page to a recording medium such as a hard disk. Alternatively, the supply of the program of the present invention may be implemented by dividing a program code which constitutes the program into a plurality of files and downloading the files from different homepages. That is, a WWW server which allows a plurality of users to download a program file required to implement the functional processing of the present invention by a computer also falls within the scope of the claims of the present invention.

The program of the present invention may also be encrypted, stored in a storage medium such as a CD-ROM, and distributed to users. The present invention can also be implemented by allowing a user who meets predetermined conditions to download key information for decryption over the Internet, execute the encrypted program using the key information, and install the program in a computer.

The functions of the embodiments are implemented when a computer executes a read-out program. The functions of the embodiments can also be implemented when an OS or the like running on the computer performs part or all of actual processing in accordance with the instructions of the program.

After a program read out from a recording medium is written in a memory of a function expansion board or function expansion unit, a CPU or the like of the function expansion board or function expansion unit may perform part or all of actual processing in accordance with the instructions of the program. The functions of the embodiments are also implemented by the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-253794, filed Sep. 1, 2005, which is hereby incorporated by reference herein in its entirety.

What is claimed is:

1. An image processing apparatus comprising:
   an image reading unit which reads an image of a document, the image including an information symbol;
   an identification unit which identifies the information symbol in the read image;

a decoding unit which decodes the information symbol identified by the identification unit;
a determination unit which determines, based on decoding result from the decoding unit, whether or not a data format of the information symbol is a prescribed data format;
a registration unit which registers information, for each of a plurality of addresses, indicating whether or not the information symbol should be deleted from the read image, in a case where the determination unit determines that the data format of the information symbol is the prescribed data format;
a selection unit which selects one of the plurality of addresses as a transmission destination of the read image;
a deletion unit which deletes the information symbol from the read image in a case where the information registered for the address selected by the selection unit indicates that the information symbol should be deleted from the read image;
a transmission unit which transmits the read image data, from which the information symbol is deleted, to the address selected by the selection unit in a case where the information registered for the address selected by the selection unit indicates that the information symbol should be deleted from the read image, and which transmits the read image data, from which the information symbol is not deleted, to the address selected by the selection unit in a case where the information registered for the address selected by the selection unit indicates that the information symbol should not be deleted from the read image; and a processor configured to function as at least one of the identification unit, the determination unit, the selection unit and the deletion unit.

2. The image processing apparatus according to claim 1, wherein the transmission unit faxes the read image.

3. The image processing apparatus according to claim 1, wherein the transmission unit transmits an e-mail to which the read image is attached.

4. An image processing method including:
an image reading step of reading an image of a document, the image including an information symbol;
an identification step of identifying the information symbol in the read image;
a decoding step of decoding the information symbol identified in the identification step;
a determination step of determining, based on a result of the decoding in the decoding step, whether or not a data format of the information symbol is a prescribed data format;
a registration step of registering information, for each of a plurality of addresses, indicating whether or not the information symbol should be deleted from the read image, in a case where the data format of the information symbol is the prescribed data format based on the determination made in the determination step;
a selection step of selecting one of the plurality of addresses as a transmission destination of the read image;
a deletion step of deleting the information symbol from the read image in a case where the information registered for the address selected in the selection step indicates that the information symbol should be deleted from the read image; and
a transmission step of transmitting the read image data, from which the information symbol is deleted, to the address selected in the selection step in a case where the information registered for the address selected in the selection step indicates that the information symbol should be deleted from the read image, and of transmitting the read image data, from which the information symbol is not deleted, to the address selected in the selection step in a case where the information registered for the address selected in the selection step indicates that the information symbol should not be deleted from the read image.

5. A non-transitory storage medium computer-readably storing an image processing program for causing a computer to execute:
an image reading step of reading an image of a document, the image including an information symbol;
an identification step of identifying the information symbol in the read image;
a decoding step of decoding the information symbol identified in the identification step;
a determination step of determining, based on a result of the decoding in the decoding step whether or not a data format of the information symbol is a prescribed data format;
a registration step of registering information, for each of a plurality of addresses, indicating whether or not the information symbol should be deleted from the read image, in a case where the data format of the information symbol is the prescribed data format based on the determination made in the determination step;
a selection step of selecting one of the plurality of addresses as a transmission destination of the read image;
a deletion step of deleting the information symbol from the read image in a case where the information registered for the address selected in the selection step indicates that the information symbol should be deleted from the read image; and
a transmission step of transmitting the read image data, from which the information symbol is deleted, to the address selected in the selection step in a case where the information registered for the address selected in the selection step indicates that the information symbol should be deleted from the read image, and of transmitting the read image data, from which the information symbol is not deleted, to the address selected in the selection step in a case where the information registered for the address selected in the selection step indicates that the information symbol should not be deleted from the read image.

* * * * *